No. 890,129. PATENTED JUNE 9, 1908.
T. DUGAN.
THRESHING MACHINE.
APPLICATION FILED SEPT. 26, 1906.
2 SHEETS—SHEET 2.
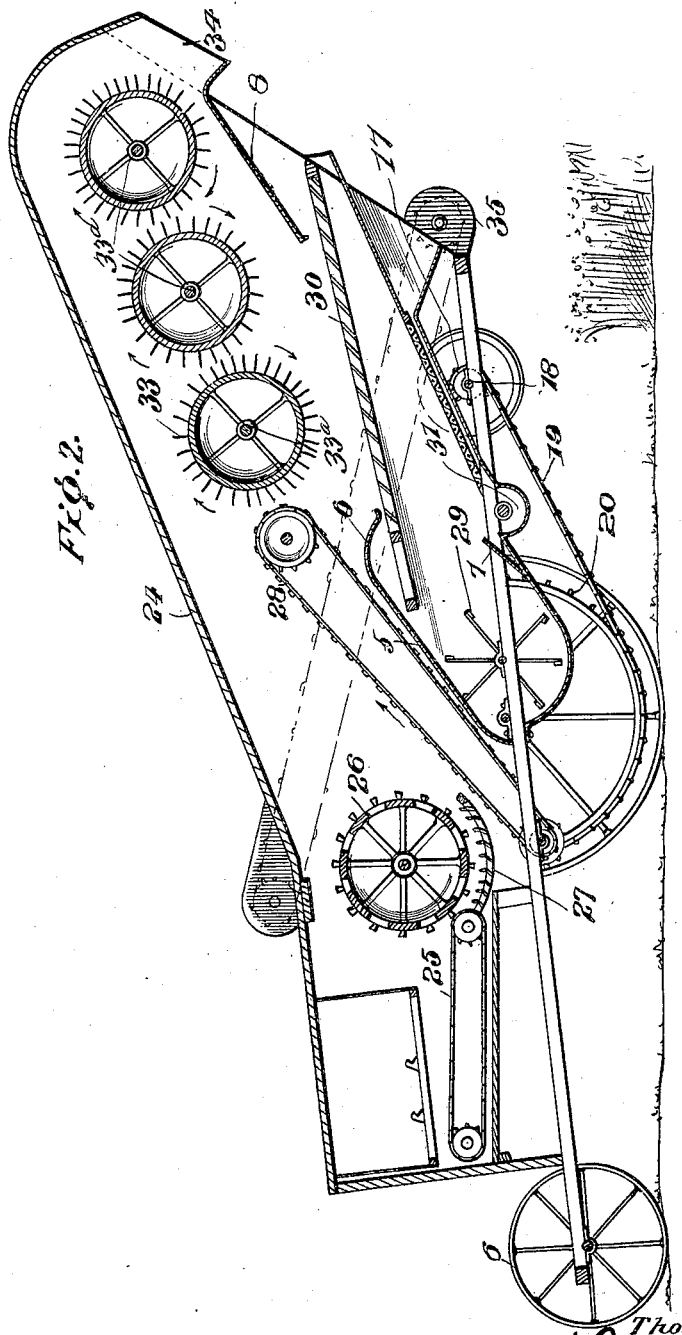
Witnesses
Inventor
Thomas Dugan
Attorneys

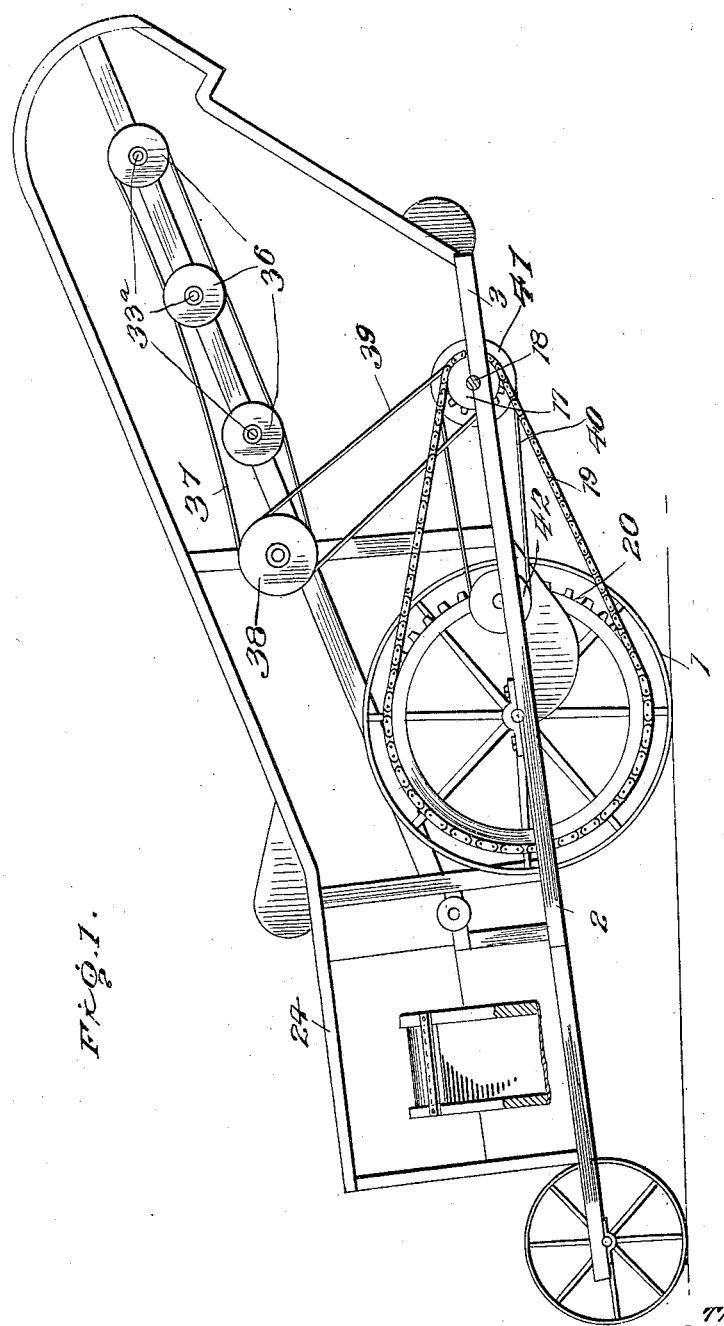

UNITED STATES PATENT OFFICE.

THOMAS DUGAN, OF LARNED, KANSAS.

THRESHING-MACHINE.

No. 890,129.　　　　　Specification of Letters Patent.　　　　　Patented June 9, 1908.

Application filed September 26, 1906. Serial No. 336,343.

*To all whom it may concern:*

Be it known that I, THOMAS DUGAN, a citizen of the United States, residing at Larned, in the county of Pawnee and State of Kansas, have invented certain new and useful Improvements in Threshing - Machines, of which the following is a specification.

This invention contemplates certain new and useful improvements in threshing machines, and the object of the invention is a machine of this character which will be of simple and durable construction and characterized by efficiency and ease of operation.

For a full understanding of the invention, reference is to be had to the accompanying drawings, in which:

Figure 1 is a side elevation of a threshing machine constructed in accordance with my invention. Fig. 2 is a longitudinal sectional view thereof.

Referring to the drawings the numeral 24 designates the casing of the thresher, into the front end of which the grain is fed. As the grain is fed into the casing 24 it falls upon an endless apron 25 which is inclined from the horizontal slightly in a rearward direction and is carried thereby to the threshing mechanism, consisting of cylinder 26 and concave 27. At the rear of the concave 27 an inclined endless apron 28 is arranged, said apron 28 extending rearwardly and upwardly as best seen in Fig. 2. The lower end of the endless apron 28 extends some distance below the concave 27 to catch all grain and insure its delivery to the separating mechanism. Underneath the inclined endless apron 28 a fan 29 is placed, said fan being rotated by means of a belt 40 passing around a pulley 42 on the shaft of the fan and around a similar pulley 41 on the transversely extending shaft 18 mounted in the framework 2 of the thresher. The grain itself, after being separated may be carried transversely by the screw conveyer 31 to a return elevator (not shown), while the straw is treated by the revoluble beaters 33 located in the casing 24 at the upper rear portion thereof in the rear of the endless apron 28. Underneath the series of feeders 33 is the shoe 30. The straw and chaff finally passes out the discharge spout 34.

There are three of the revoluble beaters 33, mounted upon the shafts 33ª. Each shaft carries a pulley 36, and the pulleys are connected for simultaneous actuation by means of a belt 37 which also passes over and receives its motion from a pulley 38 on the upper shaft of the conveyer 28. The pulley 38 is also operatively connected by means of the belt 39 with a pulley on the shaft 18, so as to receive its motion from said shaft. The shaft 18 carries a sprocket wheel 17 which is operatively connected by the chain 19 with the relatively large sprocket wheel 20 on the rear traveling wheel 1.

In the operation of the beaters 33, the straw is taken off the endless apron 28 and kept well shaken up until it leaves the separator. As the beaters 33 operate with a rotary motion, it is obvious that they run much more easily than a vibrating straw rack which is used in ordinary separators. The revoluble beaters 33 have an inclined arrangement as indicated most clearly in Fig. 2, to elevate the grain and thereby loosen and lighten the same to insure removal of all heads or kernels. The upper portions of the beaters rotate in the same direction, as indicated by the arrows, so that the grain is delivered from one beater to the next in order. The separating shoe 30 is located directly below the beaters so as to catch all grain dislodged from the straw in the passage of the same through the machine.

A plate 5 is located below the endless apron 28 and above the fan 29 and inclines upwardly and rearwardly, the upper rear end 6 of said plate overhanging the lower receiving end of the shoe 30. The plate 5 acts as a deflector and its curved end 6 deflects the blast of air downward through the shoe so as to carry off all chaff and light particles and insure clean grain entering the conveyer 31. A plate 8 is located above the rear end of the shoe 30 and acts as a return board to direct any grain that may fall from the straw near the discharge end of the separator back upon the shoe 30. A space is provided below the deflector 8 and the delivery end of the shoe for the escape of chaff and light particles that may be carried off by the blast of air. A deflector 7 is located in front of the conveyer 31 and inclines upward and rearward from the bottom of the fan casing so as to direct the air from the fan across the conveyer 31 to carry off light particles falling with the grain from the upper screen of the shoe.

Having thus described the invention, what is claimed as new is:

1. In a machine of the character specified, the combination of a threshing mechanism, an upwardly and rearwardly inclined endless apron having its lower portion extended beneath the threshing mechanism, a series of revoluble beaters located in the rear of the endless apron and having an upwardly and rearwardly inclined arrangement and adapted to be rotated in the same direction, a separating shoe located below the discharge end of said endless apron and below the said revoluble beaters, a fan located in front of the shoe and below the aforesaid endless apron and adapted to direct a blast of air through the shoe and between the said revoluble beaters, a plate arranged above the fan and below the said endless apron and inclined upward and rearward and terminating in a rearwardly and downwardly curved deflecting portion extended over the shoe, and an upwardly and rearwardly inclined deflector arranged below the receiving end of the shoe and the said curved deflecting end portion.

2. In a machine of the character specified, the combination of a threshing mechanism, an upwardly and rearwardly inclined endless apron having its lower portion extended beneath the threshing mechanism, a series of revoluble beaters located in the rear of the endless apron and having an upward and rearward inclined arrangement and adapted to be rotated in the same direction, a separating shoe located below the discharge end of said endless apron and below the said revoluble beaters, a fan located in front of the shoe and below the aforesaid endless apron and adapted to direct a blast of air through the shoe and between the said revoluble beaters, an upwardly and rearwardly inclined plate arranged above the fan and below the said endless apron and having its upper end curved downwardly and extended over the shoe, a transverse conveyer in advance of the fan and at the lower front end of the shoe, an upwardly and rearwardly inclined deflector below the shoe and in front of said conveyer and between it and the fan to act in conjunction with the curved end of the said deflector, and a return grain board at the discharge end of the machine and below the revoluble beaters and between them and the upper rear end of the shoe, leaving a space between the said grain board and the shoe for the discharge of chaff and light particles.

In testimony whereof I affix my signature in presence of two witnesses.

THOMAS DUGAN. [L. S.]

Witnesses:
 A. D. SMITH,
 SAMUEL E. TURNER.